United States Patent
Singh

(10) Patent No.: US 12,142,119 B1
(45) Date of Patent: Nov. 12, 2024

(54) INTELLIGENT METHOD AND SYSTEM ON AUTONOMOUS MONITORING AND CONTROLLING OF AUTOMATIC TELLER MACHINES ("ATMS") IN DISTRESS CONDITIONS LEVERAGING SUB-ORBITAL SATELLITE NETWORK

(71) Applicant: Bank of America Corporation, Charlotte, NC (US)

(72) Inventor: Shailendra Singh, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/401,639

(22) Filed: Jan. 1, 2024

(51) Int. Cl.
*G07F 19/00* (2006.01)
*H04W 84/06* (2009.01)

(52) U.S. Cl.
CPC .......... *G07F 19/209* (2013.01); *G07F 19/207* (2013.01); *H04W 84/06* (2013.01)

(58) Field of Classification Search
CPC .............................. G07F 19/207; G07F 19/209
USPC ........................................................ 235/379
See application file for complete search history.

(56) References Cited

U.S. PATENT DOCUMENTS

| | | | |
|---|---|---|---|
| 11,240,254 B2 | 1/2022 | Metzger et al. | |
| 2019/0386969 A1* | 12/2019 | Verzun | G06F 21/606 |
| 2020/0150644 A1* | 5/2020 | Cella | G05B 23/0283 |
| 2021/0264407 A1 | 8/2021 | Moudgal et al. | |

OTHER PUBLICATIONS

"Space Bridge: Pioneering Payments in Space," https://www.jpmorgan.com/onyx/payments-in-space.htm, JP Morgan Chase & Co., Retrieved Sep. 15, 2023.

\* cited by examiner

*Primary Examiner* — Toan C Ly
(74) *Attorney, Agent, or Firm* — Weiss & Arons LLP

(57) ABSTRACT

A method and system are provided for autonomously controlling and monitoring automatic teller machines ("ATMs"), leveraging a network of low-orbit satellites, during an ATM distress event. The method and system may include creating, using an ATM distress program in a first ATM, a distress message payload ("DMP") associated with the first ATM. The method and system may include creating, using a data recovery and purge program in one or more ATMs ("the ATMs"), data recovery and purge payloads ("DRAPPs") associated with the ATMs. The method and system may further include storing the DRAPPs in low-orbit satellites in a network of low-orbit satellites. The method and system may include running a recovery/purge orchestration engine to identify an optimal pathway for transporting the DRAPPs. The pathway may include low-orbit satellites in the network of low-orbit satellites as carriers for the DRAPPs to a centralized server.

20 Claims, 6 Drawing Sheets

Architecture diagram

Technical process steps :
- Automatic teller machine(ATM) analyzes a distress scenario using a deep learning algorithm
- ATM generates a distress payload
- Low-orbital satellite scans and monitors the ATM distress signal
- Satellite establishes connection with distressed ATM(s)
- ATM transfers distress payload to nearest sub-orbital satellite
- Satellite network analyzes distress payload and executes recovery/purge operation
- Satellite network analyzes distress and executes preventive action on other ATM(s) using deep learning algorithm
- Satellite network maintains a recovery/purge execution trace in a space blockchain network
- Recovery and purge orchestration are indigenously managed and controlled by a satellite network based on bank security rules
- Recovery and purge data are managed in sub-orbital satellites using a homomorphic encryption layer to secure privacy

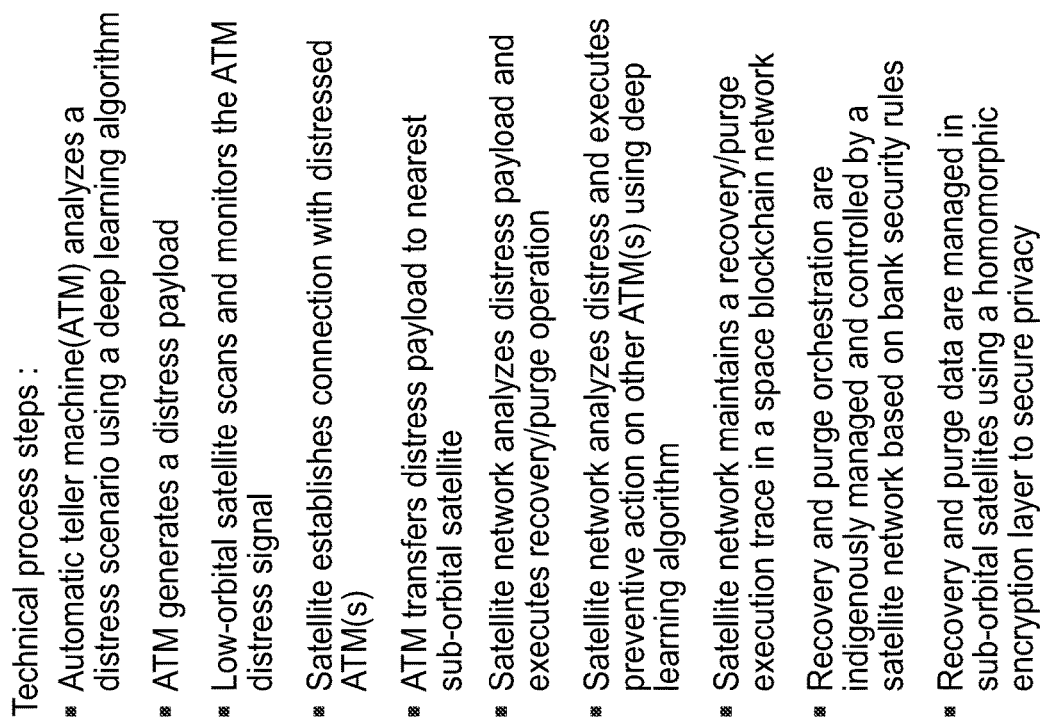

Architecture diagram

Technical process steps:

- Automatic teller machine(ATM) analyzes a distress scenario using a deep learning algorithm
- ATM generates a distress payload
- Low-orbital satellite scans and monitors the ATM distress signal
- Satellite establishes connection with distressed ATM(s)
- ATM transfers distress payload to nearest sub-orbital satellite
- Satellite network analyzes distress payload and executes recovery/purge operation
- Satellite network analyzes distress and executes preventive action on other ATM(s) using deep learning algorithm
- Satellite network maintains a recovery/purge execution trace in a space blockchain network
- Recovery and purge orchestration are indigenously managed and controlled by a satellite network based on bank security rules
- Recovery and purge data are managed in sub-orbital satellites using a homomorphic encryption layer to secure privacy

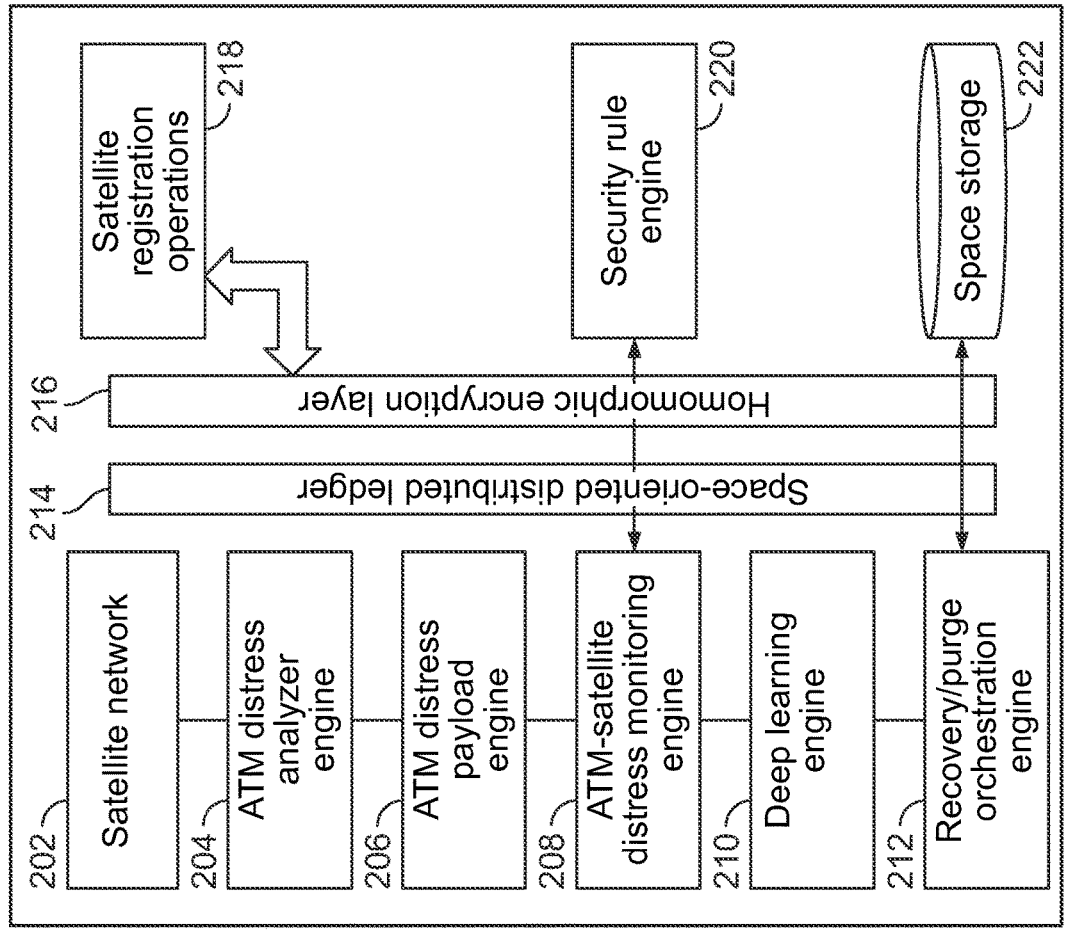

FIG. 2

Data payload tracking — 402

| Automatic teller machine Name (404) | Satellite Name (406) | ATM geolocation (408) | Sat Lng (410) | Az(t) (412) | Az(m) (414) | El (416) | Skew: 0 (418) | Skew: 90 (420) | Distress Payload ID (422) | Response payload (424) | ATM data recovery & purge status (426) |
|---|---|---|---|---|---|---|---|---|---|---|---|
| ATM_10023 | Turbo HD East | New York - Latitude: 30° 35.04452' N, Longitude: 63° 69.79210' W | 69.2W | 173 | 185.2 | 43 | -5.5 | 84.5 | DP_ATM_10_023 | Rep-payload001 | Success |
| ATM_10032 | Superdish 105 | New York - Latitude: 40° 45.04452' N, Longitude: 73° 79.79210' W | 112.0W | 230 | 242.7 | 29 | 35.5 | 125.5 | DP_ATM_10_032 | Rep-payload001 | Success |
| ATM_10099 | Dish 500 | New York - Latitude: 50° 55.04452' N, Longitude: 83° 89.79210' W | 114.5W | 233 | 245.2 | 28 | 37 | 127 | DP_ATM_10_099 | Rep-payload002 | Success |
| ATM_100001 | Superdish 121 | New York - Latitude: 60° 65.04452' N, Longitude: 93° 99.79210' W | 115.5W | 234 | 246.1 | 27 | 37.6 | 127.6 | DP_ATM_10_0001 | Rep-payload002 | Success |
| ATM_10067 | Dish 1000/1000+ | New York - Latitude: 70° 75.04452' N, Longitude: 103° 109.79210' W | 119.5W | 237 | 249.9 | 24 | 39.6 | 129.6 | DP_ATM_10_067 | Rep-payload002 | Success |
| ATM_10077 | Dish 1000/1000+ | New York - Latitude: 80° 85.04452' N, Longitude: 113° 119.79210' W | 119.5W | 237 | 249.9 | 24 | 39.6 | 129.6 | DP_ATM_10_077 | Rep-payload002 | Success |

* Satellite networks maintains a recovery/purge execution trace in a space blockchain network

FIG. 4

INTELLIGENT METHOD AND SYSTEM ON AUTONOMOUS MONITORING AND CONTROLLING OF AUTOMATIC TELLER MACHINES ("ATMS") IN DISTRESS CONDITIONS LEVERAGING SUB-ORBITAL SATELLITE NETWORK

FIELD OF TECHNOLOGY

Aspects of the disclosure relate to satellite monitoring of automatic teller machines ("ATMs").

BACKGROUND OF THE DISCLOSURE

Electronic communication and network connection between devices and networks are generally enabled via ground-based communication channels, e.g., optical fibers. With the rapid growth of the space and satellite industry, both private and government companies are launching low-orbit satellites for communication and navigation. As such, in circumstances where ground-based communication channels may not be available, during ATM distress events, and/or in circumstances where an even quicker delivery is essential, using low-orbit satellites for transmission may be an optimal choice.

ATMs may experience power outages or other distress conditions leaving ATMs vulnerable to external attack and hacking. ATMs may store confidential data at risk when ATMs experience distress conditions. Therefore, when an ATM experiences a distress condition, it would be beneficial to extract the ATM data from the ATM, purge the ATM data from the ATM prior to or concurrent with the distress condition, and recover the ATM data back to the ATM after the distress condition is resolved.

There is a need for space-based ATM monitoring technology for autonomously controlling ATMs during distress conditions. It would be desirable, therefore, to leverage low-orbit satellites in a low-orbit satellite network to autonomously monitor and control ATMs affected by an ATM distress event.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 2 shows an illustrative flow diagram in accordance with principles of the disclosure;

FIG. 4 shows an illustrative diagram in accordance with principles of the disclosure;

DETAILED DESCRIPTION OF THE DISCLOSURE

Figure 1:
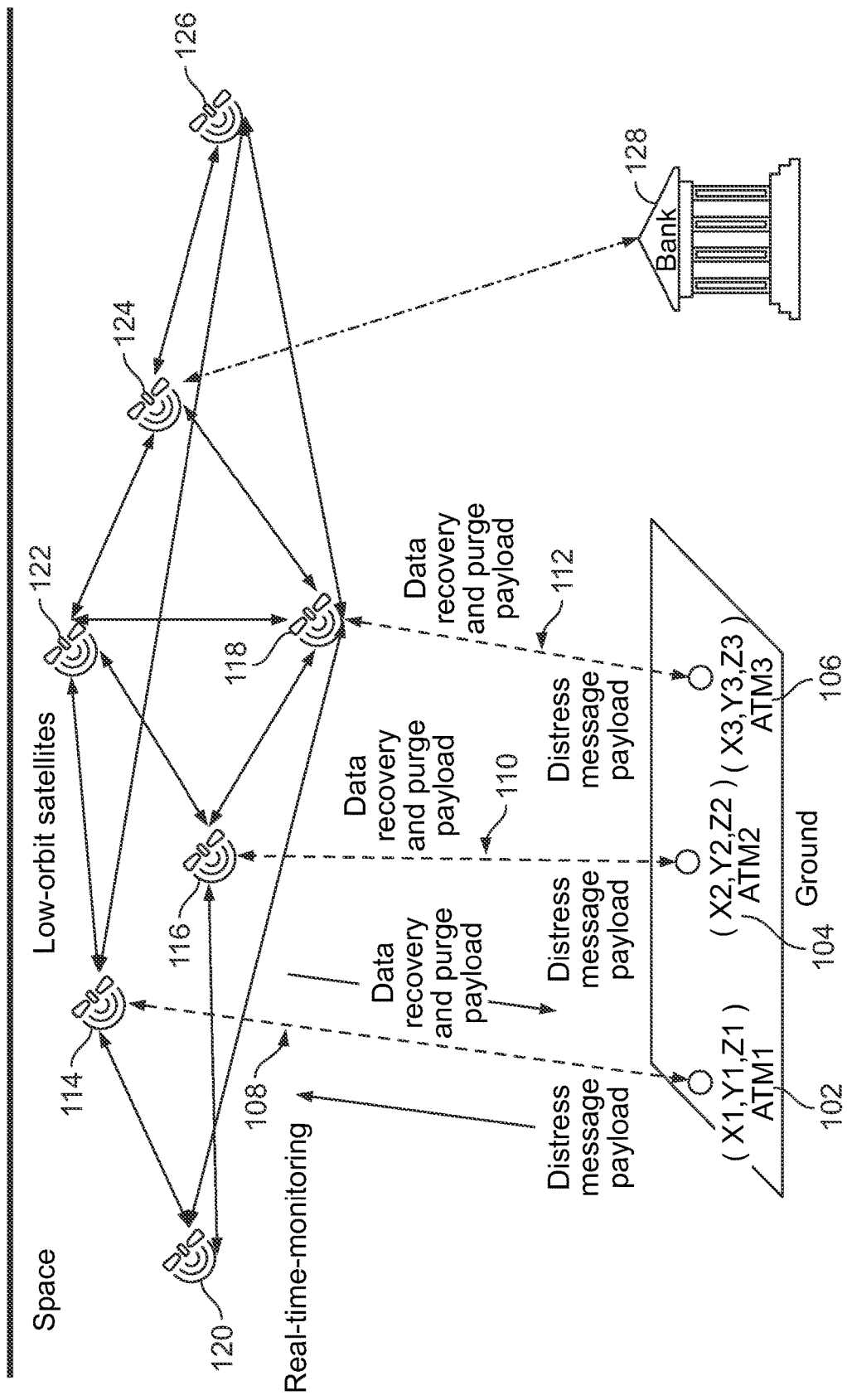
FIG. 1 shows an illustrative system in accordance with the principles of the disclosure.

Systems and methods are provided for an autonomous technical procedure to monitor and control ATMs during distress conditions by leveraging a sub-orbital satellite network. Distress conditions may include natural calamities, power outages, data hacking, data breaches, or any other ATM distress events.

The systems and methods may include an ATM. The ATM may include an ATM distress program. The ATM distress program may be built into the ATM. The ATM distress program may detect a loss or outage in ATM network connectivity. The ATM distress program may relay a distress message payload to the nearest sub-orbital satellite. The distress message payload may include the ATM distress events.

The systems and methods may include a satellite. The systems and methods may include a satellite network. The satellite network may include a plurality of satellites in network and blockchain communication with one another. The satellite network may be sub-orbital. The satellite network may be continuous without requiring optical fiber.

The systems and methods may include an ATM monitoring program. The ATM monitoring program may be built into each satellite in the sub-orbital satellite network. The ATM monitoring program may be hosted on the sub-orbital satellite network. The ATM monitoring program may scan ATMs spread across geographical locations continuously in real-time, 24 hours a day, 7 days a week, and 365 days a year.

The ATM monitoring program may cluster ATMs that are out of a financial institution network. The ATM monitoring program may initiate an ATM data recovery and purge program for an individual ATM or a cluster of ATMs.

The systems and methods may include a sub-orbital satellite network. The sub-orbital satellite network may orchestrate a data recovery and purge program based on analyzing a distress message payload. The distress message payload may include ATM distress messages.

The systems and methods may keep track of all ATM distress messages. The systems and methods may execute recovery and purge operations in real-time. The systems and methods may detect ATM anomalies instantaneously. The systems and methods may detect ATM anomalies over a set amount of time (e.g., 1 day, 1 week, 1 month, 1 year). An ATM anomaly may be an ATM distress event, ATM disconnection, or other ATM malfunction.

The systems and methods may analyze ATM distress messages leveraging deep learning algorithms. The systems and methods may predict possible ATM outages on other ATMs.

The systems and methods may trigger a preventive ATM data recovery and purge program. The preventive ATM data recovery and purge program may predict ATM outages in specific ATMs. The preventative ATM data recovery and purge program may predict ATM outages based on threshold probabilities of ATM outages occurring within certain amounts of time. The threshold probabilities of ATM outages may be based on past historical ATM outage data and current ATM outage data. The past and current ATM outage data may be from specific ATMs and from ATMs located threshold distances from the specific ATMs.

The preventive ATM data recovery and purge program may recover data from the specific ATMs to the sub-orbital satellite network. The preventive ATM data recovery and purge program may purge data from the specific ATMs in a particular sequence.

The preventive ATM data recovery and purge program may operate a threshold time before an ATM distress event. For example, the preventive ATM data recovery and purge program may operate 1 minute, 10 minutes, 20 minutes, 30 minutes, 1 hour, 2 hours, 5 hours, 24 hours, 1 week, 1 month, and 1 year before the ATM distress event.

Recovery and purge orchestration may be indigenously managed and controlled by satellites in the satellite network based on financial institution security rules. The term "indigenously" means that the data stored in the ATM machine is purged and controlled from the satellites in the satellite network. The term "indigenously" may be used interchangeably with the term "autonomously."

The satellites in the satellite network may act as a third-party during ATM distress or connectivity loss. The satellites in the satellite network may identify ATM distress events and decide what ATM data to purge. For example, the satellites in the satellite network may copy, save, and purge select data (e.g., customer ID, account number). The satellites in the satellite network may decide how much time the satellites in the satellite network may store the information and where to store the information.

Recovery and purge data may be managed by the sub-orbital satellite network using a homomorphic encryption layer to secure privacy. The homomorphic encryption layer may provide additional security for confidential data by allowing data computations without an encryption key. The satellites in the satellite network may maintain a recovery and purge execution trace in a space blockchain network. Each satellite may be a node within the space blockchain network, which is the sub-orbital satellite network. Each satellite may be a node in a blockchain.

The systems and methods may include technical components. The technical components may be included within each satellite in the sub-orbital satellite network. The systems and methods may include the following technical components: satellite registration operations, an ATM distress analyzer engine, an ATM distress payload engine, an ATM-satellite distress monitoring engine, a deep learning engine, and a recovery/purge orchestration engine.

The satellite registration operations may register and unregister satellites into and out of the satellite network. The ATM distress analyzer engine may analyze distress signals sent from ATMs. The ATM distress payload engine may create a distress message payload ("DMP") in response to an ATM distress event. The ATM-satellite distress monitoring engine may monitor ATMs located threshold distances from satellites in a satellite network. The deep learning engine may analyze ATM data and coordinate pathways and transportation of ATM data within a satellite network. The recovery/purge orchestration engine may copy, store, and purge ATM data from ATMs and satellites in a satellite network.

The ATMs may send signals to satellites in the satellite network. The ATMs may send signals to satellites regarding ATM distress events.

A method for autonomously controlling and monitoring ATMs during an ATM distress event is provided. The term "autonomously" means that when ATM connectivity is lost or an ATM distress event occurs, there may be an external computer (e.g., a satellite or satellites in a network of satellites) managing, monitoring, and controlling the ATM data.

An ATM distress event may be an event that causes ATM distress. ATM distress events may include, for example, ATM power outages, ATM damage, ATM theft, and ATM malfunctions. The ATM distress events may result from, for example, lightning, electrical issues, extreme weather, earthquakes, solar flares, hacker activity, and fire.

The method for autonomously controlling and monitoring the ATMs may be executed by satellites in a network of low-orbit satellites. The method may include identifying, at a first ATM, an ATM distress event. The method may include creating, using an ATM distress program stored on the first ATM, a DMP associated with the first ATM.

The DMP may include a geolocation of the first ATM. The DMP may include ownership of the first ATM. The DMP may include the ATM distress event.

The method may include transmitting, using the first ATM, the DMP to a first low-orbit satellite in the network of low-orbit satellites. The method may include transmitting, using the first low-orbit satellite, the DMP to all low-orbit satellites in the network of low-orbit satellites.

The method may include scanning, using an ATM monitoring program stored on all low-orbit satellites in the network of low-orbit satellites, all ATMs affected by the ATM distress event, including the first ATM ("the ATMs"). The method may include transmitting, using low-orbit satellites in the network of low-orbit satellites located threshold distances from the ATMs, a data recovery and purge program to the ATMs.

The method may include creating, using the data recovery and purge program in the ATMs, data recovery and purge payloads ("DRAPPs"). The DRAPPs may be associated with the ATMs. The DRAPPs may include geolocations of the ATMs. A geolocation of an ATM may be represented by an (X, Y) or an (X, Y, Z) coordinate.

The DRAPPs may include ownerships of the ATMs. An ownership of an ATM may be represented by an identity or an entity. The DRAPPs may include data stored on the ATMs. The data stored on the ATMs may include data from ATM users, smart cards, transactions, and financial institutions. The data may include smart card IDs, user IDs, account numbers, and other information.

The DRAPPs may include storing, on all low-orbit satellites in the network of low-orbit satellites, the DRAPPs. The DRAPPs may include purging, using the data recovery and purge program stored on the ATMs, the data stored on the ATMs.

The DRAPPs may include running a recovery/purge orchestration engine, using the first low-orbit satellite. The recovery/purge orchestration engine may use machine learning ("ML"). The ML may identify a pathway for transporting the DRAPPs to a centralized server. The pathway may include all low-orbit satellites in the network of low-orbit satellites operating as carriers for the DRAPPs to the centralized server.

The method may include storing, on all low-orbit satellites in the network of low-orbit satellites, a copy of the DRAPPs in a satellite blockchain distributed ledger. Each low-orbit satellite in the network of low-orbit satellites may be a block in the satellite blockchain distributed ledger.

The method may include receiving on the centralized server, via the recovery/purge orchestration engine, the DRAPPs. The method may include transferring, after the ATM distress event, the DRAPPs between low-orbit satellites in the network of low-orbit satellites located threshold distances from the ATMs and the ATMs, via the centralized server.

The method may include, following a lapse of a pre-determined amount of time, deleting, via the first low-orbit satellite, the DRAPPs from the satellite blockchain distributed ledger. The method may include, following a lapse of a pre-determined amount of time, deleting, via centralized server, the DRAPPs from the centralized server. A pre-determined amount of time may be, for example, 1 day, 1 week, 1 month, and 1 year.

The method may include, following the transferring of the DRAPPs to the ATMs, deleting the DRAPPs from the satellite blockchain distributed ledger, via the first low-orbit satellite. The method may include, following the transferring of the DRAPPs to the ATMs, deleting the DRAPPs from the centralized server, via the recovery/purge orchestration engine. Each copy of the DRAPPs in the satellite blockchain distributed ledger may be broadcast as blocks to an earth-based blockchain distributed ledger. An earth-based blockchain distributed ledger may be in ATMs, smart phones, financial institutions, and/or computers.

The method may include, following the transferring the DRAPPs to the ATMs, transferring, via the centralized server, the DRAPPs to smartphones. The smartphone may be located a threshold distance from a low-orbit satellite in the network of low-orbit satellites. The low-orbit satellites in the network of low-orbit satellites may be pre-registered with an entity network associated with the centralized server.

The method may include, reserving, via the recovery/purge orchestration engine at the first low-orbit satellite, the low-orbit satellites identified by ML for the pathway for transporting the DRAPPs. The method may include optimizing the pathway, via the recovery/purge orchestration engine at the first low-orbit satellite, based on a DMP type associated with the ATM distress event. The DMP type may be one of a low-value distress, a high-value distress, a time-sensitive distress, a physical distress, an electrical distress, a human-related distress, and a weather-related distress. When the DMP type is time-sensitive, the method may include selecting, via the recovery/purge orchestration engine, low-orbit satellites from within the network of low-orbit satellites that enables a quickest transmission of the DRAPPs to the centralized server.

The method may include identifying, at the ATMs, additional potential ATM distress events. Additional potential ATM distress events may include other ATM distress events that may be predicted to occur. The additional potential ATM distress events may include events with a threshold probability of occurring within a certain amount of time.

The method may include scanning, using an ATM distress analyzer engine in all low-orbit satellites in the network of low-orbit satellites, based on the DMP, all ATMs affected by the additional potential ATM distress events, including the ATMs ("the ATMs"). The method may include transmitting, using low-orbit satellites in the network of low-orbit satellites located threshold distances from the ATMs, a preventive data recovery and purge program to the ATMs.

The method may include creating, using the preventive data recovery and purge program in the ATMs, DRAPPs. The DRAPPs may be associated with the ATMs. The DRAPPs may include geolocations of the ATMs. The DRAPPs may include ownerships of the ATMs. The DRAPPs may include data stored on the ATMs.

The method may include storing, using all low-orbit satellites in the network of low-orbit satellites, the DRAPPs. The method may include purging, using the preventive data recovery and purge program in the ATMs, the data stored on the ATMs.

The method may include running the recovery/purge orchestration engine, using the first low-orbit satellite. The recovery/purge orchestration engine may use ML to identify a pathway for transporting the DRAPPs. The pathway may include all low-orbit satellites from the network of low-orbit satellites operating as carriers for the DRAPPs to a centralized server.

The method may include storing, using all low-orbit satellites in the network of low-orbit satellites, a copy of the DRAPPs in a satellite blockchain distributed ledger. Each low-orbit satellite in the network of low-orbit satellites may be a block in the satellite blockchain distributed ledger.

The method may include receiving on the centralized server, via the recovery/purge orchestration engine, the DRAPPs. The method may include transferring, after the additional potential ATM distress events, the DRAPPs between low-orbit satellites in the network of low-orbit satellites located threshold distances from the ATMs, via the centralized server.

The method may include, after creating the DRAPPs, subjecting the DRAPPs to homomorphic encryption. Homomorphic encryption may include a form of encryption that allows computations to be performed on encrypted data without first having to decrypt it. Homomorphic encryption may include a form of encryption with an additional evaluation capability for computing over encrypted data without access to a secret key. Homomorphic encryption may include a form of encryption that remains encrypted during computations.

A system for autonomously controlling and monitoring ATMs during an ATM distress event is provided. The system may include ATMs and a network of low-orbit satellites. Each low-orbit satellite within the network may operate as an authentic node. Each authentic node may maintain a satellite blockchain distributed ledger.

The system may be configured to identify, at a first ATM, the ATM distress event. The system may be configured to create, using an ATM distress program in a first ATM, a DMP associated with the first ATM. The DMP may include a geolocation of the first ATM. The DMP may include ownership of the first ATM. The DMP may include the ATM distress event.

The system may be configured to transmit, using the first ATM, the DMP to a first low-orbit satellite. The system may be configured to transmit, using the first low-orbit satellite, the DMP to all low-orbit satellites in the network of low-orbit satellites.

The system may be configured to scan, using an ATM monitoring program in the network of low-orbit satellites, ATMs affected by the ATM distress event, including the first ATM ("the ATMs"). The system may be configured to transmit, using low-orbit satellites in the network of low-orbit satellites located threshold distances from the ATMs, a data recovery and purge program to the ATMs.

The system may be configured to create, using the data recovery and purge program in the ATMs, DRAPPs. The DRAPPs may be associated with the ATMs. The DRAPPs may include geolocations of the ATMs. The DRAPPs may include ownerships of the ATMs. The DRAPPs may include data stored on the ATMs.

The system may be configured to store, using all low-orbit satellites in the network of low-orbit satellites, the DRAPPs. The system may be configured to purge, using the data recovery and purge program in the ATMs, the data stored on the ATMs.

The system may be configured to run a recovery/purge orchestration engine, using the first low-orbit satellite. The recovery/purge orchestration engine may use ML to identify a pathway for transporting the DRAPPs. The pathway may include low-orbit satellites from the network of low-orbit satellites operating as carriers for the DRAPPs to a centralized server.

The system may be configured to store, using all low-orbit satellites in the network of low-orbit satellites, a copy of the DRAPPs in the satellite blockchain distributed ledger. Each low-orbit satellite in the network of low-orbit satellites may be a block in the satellite blockchain distributed ledger.

The system may be configured to receive on the centralized server, via the recovery/purge orchestration engine, the DRAPPs. The system may be configured to transfer, after the ATM distress event, the DRAPPs between low-orbit satellites in the network of low-orbit satellites located threshold distances from the ATMs and the ATMs, via the centralized server.

The system may be configured such that each authentic node may be authenticated by an entity network associated with the centralized server. The system may be configured such that each authentic node may be authenticated prior to being added to the network of low-orbit satellites.

The system may be configured such that the recovery/purge orchestration engine may include rules defined between an entity network, the ATMs, and all the satellites in the network of low-orbit satellites.

The system may be configured such that the satellite blockchain distributed ledger may be synchronized with an earth-based blockchain distributed ledger.

The system may be configured such that following the receiving of the DRAPPs at the centralized server, the satellites in the network of low-orbit satellites may delete the DRAPPs from all the satellites in the network of low-orbit satellites.

The system may be configured such that following a lapse of a pre-determined amount of time, the first low-orbit satellite may delete the DRAPPs from the satellite blockchain distributed ledger. The system may be configured such that following a lapse of a pre-determined amount of time, the recovery/purge orchestration engine may delete the DRAPPs from the centralized server.

The system may be configured such that the system includes smartphones. The system may be configured such that the centralized server transfers the DRAPPs to the smartphones.

Systems and methods in accordance with this disclosure will now be described in connection with the figures, which form a part hereof. The figures show illustrative features of system and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

The systems and methods may omit features shown and/or described in connection with illustrative systems. System and method embodiments may include features that are neither shown nor described in connection with illustrative systems and methods. Features of illustrative systems and methods may be combined. For example, an illustrative system and method may include features shown or described in connection with another illustrative system/method.

As will be appreciated by one of skill in the art, the disclosure described herein may be embodied in whole or in part as a method, a data processing system, or a computer program product. Accordingly, the disclosure may take the form of entirely hardware, entirely software, or combining software, hardware and any other suitable approach or system.

Furthermore, such aspects may take the form of a computer program product stored by one or more computer-readable storage encoded media having computer-readable program code, or instructions, embodied in or on the storage encoded media. Any suitable computer readable storage encoded media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting encoded media such as metal wires, optical fibers, and/or wireless transmission encoded media (e.g., air and/or space).

Illustrative information that is exchanged with the system may be transmitted and displayed using any suitable markup language under any suitable protocol, such as those based on JAVA, COCOA, XML, or any other suitable languages or protocols.

Processes in accordance with the principles of the disclosure may include one or more features of the processes illustrated in FIGS. 1-6. For the sake of illustration, the steps of the processes illustrated in FIGS. 1-6 will be described as performed by a "system." The "system" may include one or more of the features of the systems that are shown or described herein and/or any other suitable device or approach. The "system" may be provided by an entity. The entity may be an individual, an organization or any other suitable entity.

Systems and methods described herein are illustrative. Systems and methods in accordance with this disclosure will now be described in connection with the figures, which form a part hereof. The figures show illustrative features of system and method steps in accordance with the principles of this disclosure. It is understood that other embodiments may be utilized, and that structural, functional, and procedural modifications may be made without departing from the scope and spirit of the present disclosure.

FIG. 1 shows an illustrative concept diagram of autonomously monitoring and controlling ATMs using low-orbit satellites. In this illustrative diagram the ATMs leverage low-orbit satellites. The low-orbit satellites may be a part of a low-orbit satellite network.

ATM 1, at 102, may be positioned at ground-based coordinate X1, Y1, Z1. ATM 1, at 102, may include a distress message executed at ATM 1 based on an ATM distress event. The distress message may be stored in DMP 108. DMP 108 may include a unique data set generated for the ATM distress event that includes the ATM distress event and an identifier associated with ATM 1. The identifier associated with ATM 1 may include geolocation (X, Y, Z) coordinates and ownership of the ATM.

ATM 2, at 104, may be positioned at ground-based coordinate X2, Y2, Z2. ATM 2, at 104, may also include an ATM distress message executed at ATM 2 and based on an ATM distress event. The ATM distress message may be stored in DMP 110. DMP 110 may include a unique data set generated for the ATM distress event that includes the ATM distress event and an identifier associated with ATM 2.

ATM 3, at 106, may be positioned at ground-based coordinate X3, Y3, Z3. ATM 3, at 106, may also include data associated with an ATM distress event executed at ATM 3. The data associated with the ATM distress event may be stored in DMP 112. DMP 112 may include a unique data set generated for the ATM distress event that includes the ATM distress event and an identifier associated with ATM 3.

ATM 1, at 102, may be enabled to pair with satellite 114 via a satellite antenna at the ATM 1 when satellite 114 is within proximity to ATM 1. When pairing is established, ATM 1 and satellite 114 may be enabled to be in electronic communication. DMP 108 may be transmitted to satellite 114. DMP 108 may be retrieved by satellite 114.

At satellite 114, a smart contract may be generated and define an optimal pathway for DMP 108 to be transmitted to a central server. The optimal pathway may include any one or more satellites 114-126. The central server may be located at a bank, financial institution, or entity.

ATM 2, at 104, may be enabled to pair with satellite 116 via a satellite antenna at ATM 2 when satellite 116 is within proximity to ATM 2. When pairing is established, ATM 2 and satellite 116 may be enabled to be in electronic communication. DMP 110 may be transmitted to satellite 116. DMP 110 may be retrieved by satellite 116.

At satellite 116, an ML recovery/purge orchestration engine may be used to define an optimal pathway for DMP 110 to be transmitted to a central server located at bank 128. The optimal pathway may include any one or more satellites 114-126.

ATM 3, at 106, may be enabled to pair with satellite 118 via a satellite antenna at ATM 3 when satellite 118 is within proximity to ATM 3. When pairing is established, ATM 3 and satellite 118 may be enabled to be in electronic communication. Data recover and purge payload ("DRAPP") 112 may be transmitted by satellite 118. DRAPP 112 may be retrieved by ATM 3, at 106.

It should be appreciated that when any one of ATMs 102, 104 and 106 do not have a satellite antenna, the ATM may transmit the DMP to another satellite and/or ATM that may include a satellite antenna.

Each of low-orbit satellites 114, 116, 118, 120, 122, 124, and 126 may be enabled to carry one, two, three or more DMPs to the centralized server located at, for example, bank 128. When a DMP is transmitted to a satellite, the satellite may execute an ML algorithm to coordinate delivery of each DMP based on priority, size, and any other suitable specifications.

It should be appreciated that when a satellite is not carrying a DMP or a DRAPP, the satellite may still be operating as an authentic node in the blockchain network.

FIG. 2 shows an illustrative flow diagram representing the architecture diagram of the disclosure. The technical process steps of the flow diagram may include the following items.

A satellite network 202 may include one or more low-orbit satellites. Satellite network 202 may be in communication with an ATM distress analyzer engine 204. The ATM distress analyzer engine 204 may analyze distress signals sent from ATMs.

The ATM distress analyzer engine 204 may be in communication with an ATM distress payload engine 206. ATM distress payload engine 206 may create a DMP to be delivered to a low-orbit satellite.

The ATM distress payload engine 206 may be in communication with an ATM-satellite distress monitoring engine 208. ATM-satellite distress monitoring engine 208 may enable ATM to satellite communication regarding ATM distress based on the DMP. The ATM-satellite distress monitoring engine 208 may be in communication with a security rule engine 220. The security rule engine 220 may provide security rules to keep the ATM data secure and encrypted.

ATM-satellite distress monitoring engine 208 may be in communication with deep learning engine 210. Deep learning 210 may use deep learning algorithms to search and sort ATM data for recovery and purging.

Deep learning engine 210 may be in communication with a recovery/purge orchestration engine 212. The recovery/purge orchestration engine 212 may recover and purge data from ATMs affected by an ATM distress event.

The recovery/purge orchestration engine 212 may be in communication with space storage 222. Space storage 222 may store the copied ATM data. Space storage 222 may store the ATM data. The ATM data may be recovered to the ATMs after data purging.

Both the ATM-satellite distress monitoring engine 208 in communication with deep learning engine 210 and the recovery/purge orchestration engine 212 in communication with space storage 222 may pass the ATM data through a space oriented distributed ledger 214 and a homomorphic encryption layer 216. The space oriented distributed ledger 214 may organize and transport the ATM data based on a sequence of ATMs. The space oriented distributed ledger 214 may store and transport the ATM data using each low-orbit satellite as a node in a blockchain.

The homomorphic encryption layer 216 may encrypt the ATM data in such a way that the encrypted data may be used without an encryption key. For example, calculations may be run on homomorphically encrypted data via the homomorphic encryption layer 216 without an encryption key. The homomorphic encryption layer 216 may be in communication with satellite registration operations 218. Satellite registration operations 218 may enable other satellites to enter and leave the satellite network. The satellite registration operations 218 may work in tandem with the homomorphic encryption layer 216 to ensure the satellites and ATM data are secure.

The present disclosure may include technical process steps. The technical process steps may include ATM analyzing distress scenarios using deep learning algorithms. The technical process steps may include ATM generating distress payloads. The technical process steps may include low-orbital satellites scanning and monitoring distress signals at ATMs.

The technical process steps may include low-orbit satellites establishing connections with distressed ATMs. The technical process steps may include ATMs transferring distress payloads to nearest sub-orbital satellites. The technical process steps may include satellites in a satellite network analyzing ATM distress payloads.

The technical process steps may include executing a recovery/purge operation. The technical process steps may include satellites in a satellite network analyzing ATM distress payloads and executing preventive action on other ATMs using deep learning algorithms.

The technical process steps may include satellites in a satellite network maintaining a recovery/purge execution trace in a space blockchain network. A space blockchain network may include a network of satellites. The recovery and purge data may be managed in a sub-orbital satellite using a homomorphic encryption layer to secure privacy. A recovery/purge orchestration may be indigenously managed and controlled by satellites in a satellite network based on financial institution security rules.

Figure 3:
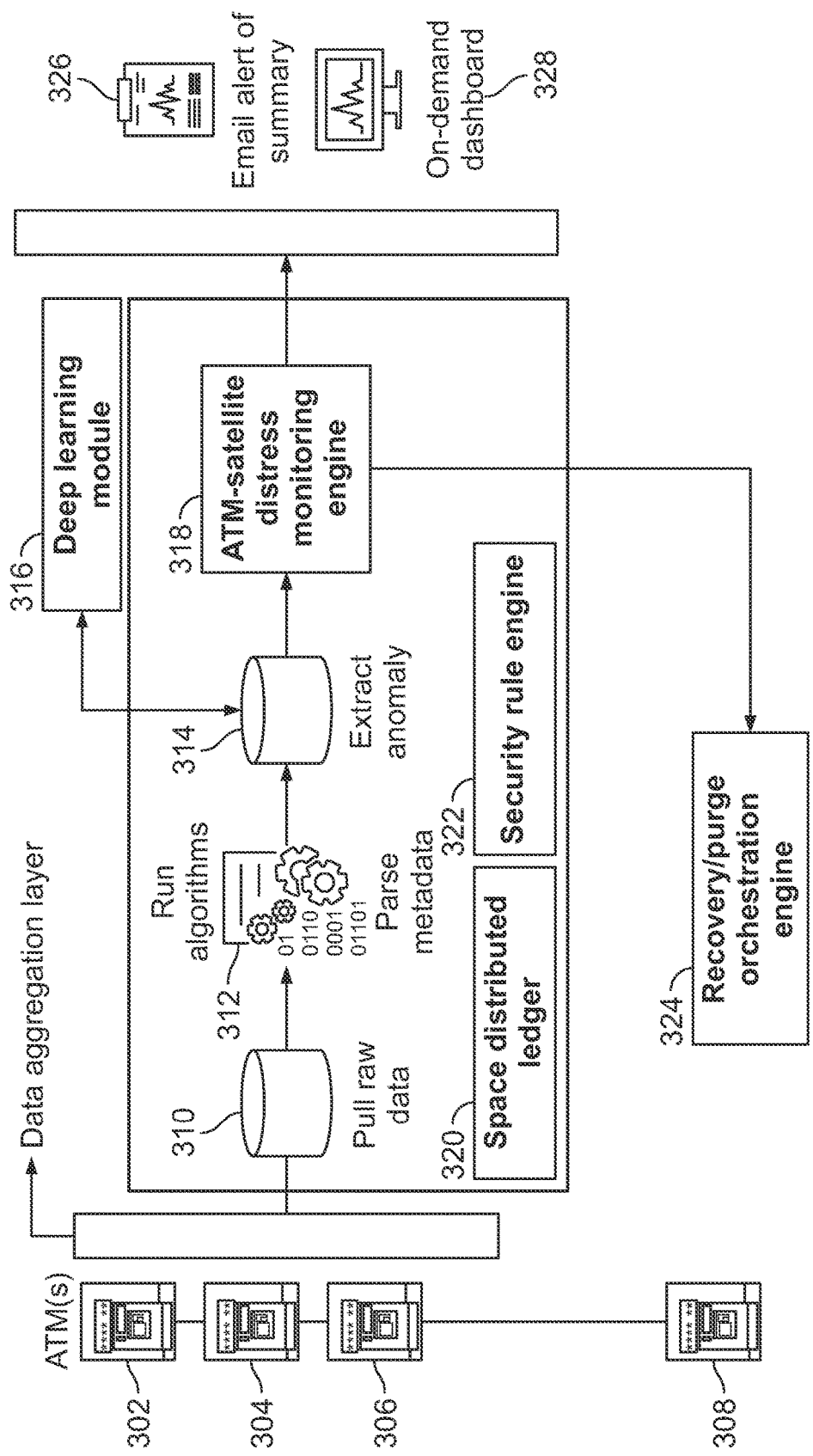
FIG. 3 shows an illustrative flow diagram in accordance with principles of the disclosure.

FIG. 3 shows an illustrative flowchart representing the distress ATM monitoring of the disclosure.

ATM(s) 302, 304, 306, and 308 represent different ATM machines. ATM(s) 302, 304, 306, and 308 may have experienced an ATM distress event. The ATM distress event produces a signal that passes through a data aggregation layer. The data aggregation layer aggregates data collected from ATM(s) 302, 304, 306, and 308 ("the ATM data").

The ATM data may include the ATM distress event and data stored on each ATM. The ATM data is passed to "pull raw data" 310. In "pull raw data" 310, raw data from the ATMs is pulled. The raw ATM data is then passed through "run algorithms" 312. In "run algorithms" 312, metadata from the raw ATM data is analyzed.

The ATM data is then passed to "extract anomaly" 314. In "extract anomaly" 314, the ATM data is analyzed for anomalies and any anomalies in the data are extracted. "Extract anomaly" 314 may be in communication with a deep learning module 316. Deep learning module 316 may provide deep learning algorithms to further refine the data anomaly detection and extraction.

From there, the ATM data is sent to an ATM-satellite distress monitoring engine 318. The ATM-satellite distress monitoring engine 318 may enable the ATM data to pass through to a satellite or satellite in a network of satellites. The "pull raw data" 310, "run algorithms" 312, "extract anomaly" 314, and ATM-satellite distress monitoring engine 318 may be controlled by a space distributed ledger 320 and a security rule engine 322. The space distributed ledger 320 may be a blockchain of satellites in a network where each satellite represents a node in the blockchain. The security rule engine 322 may have a predefined set of rules governing the blockchain and ATM data.

The ATM-satellite distress monitoring engine 318 may be in communication with a recovery/purge orchestration engine 324. The recovery/purge orchestration engine 324 may enable the satellites in a network of satellites to copy, store, purge, and recover ATM data from ATMs.

The ATM-satellite distress monitoring engine 318 may also be in communication with a GUI. The GUI may display an email alert of a summary 326 from the ATM-satellite distress monitoring engine 318 based on ATM distress event and ATM data. The GUI may display an on-demand dashboard 328 where a user may interact with the GUI to get ATM distress event and ATM data on demand.

FIG. 4 shows an illustrative table 402 representing an exemplary ATM data payload tracking.

For each ATM, column 404 may represent its ATM name (e.g., ATM_10023 and ATM_10032). Column 406 may represent a satellite name corresponding to an ATM. For example, "Turbo HD East" may correspond to "ATM_10023" and may hold data from ATM_10023. Satellites in satellite networks may maintain recovery/purge execution traces in space blockchain networks.

Column 408 may represent each ATM location where each DMP is generated prior to transmittal to a first satellite. The ATM location may be represented by geographical coordinates.

Column 410 may represent the geographical longitude of the satellite.

Column 412 may represent the true-north azimuthal angle for the satellite.

Column 414 may represent the magnetic-north azimuthal angle for the satellite.

Column 416 may be the elevation angle in degrees.

Columns 418 and 420 may represent the dishes that pick up more than one satellite. These dishes may be rotated along their aiming axis (skewed) to accommodate the relationship between local horizontal and the relative tilt of the geostationary orbit at the chosen location.

Column 422 may represent a Distress Payload ID. The Distress Payload ID may be, for example, "DP_ATM_10023" and "DP_ATM_10032."

Column 424 may represent a response payload. A response payload may be, for example, "Rep-payload001" and "Rep-payload002." The response payload may contain the ATM distress event, ATM ownership, and ATM data.

Column 426 may represent an ATM data recovery and purge status. The ATM data recovery and purge status may be, for example, "Success," if the ATM data is successfully recovered after being purged. The ATM data recovery and purge status may be, for example, "Failure," if the ATM data is unsuccessfully recovered after being purged.

As shown at column 406, satellites "Turbo HD East," "Superdish 105," "Dish 500," "Superdish 121," and "Dish 1000/1000+" may be a part of the pathway for the DMP to travel from the ATM to the central server. The DMP may hop from satellite "Turbo HD East," "Superdish 105," "Dish 500," "Superdish 121," and "Dish 1000/1000+," and then to the central server. The DMP may be transported via additional satellites, aside from satellites "Turbo HD East," "Superdish 105," "Dish 500," "Superdish 121," and "Dish 1000/1000+," in order to reach the central server.

Figure 5:
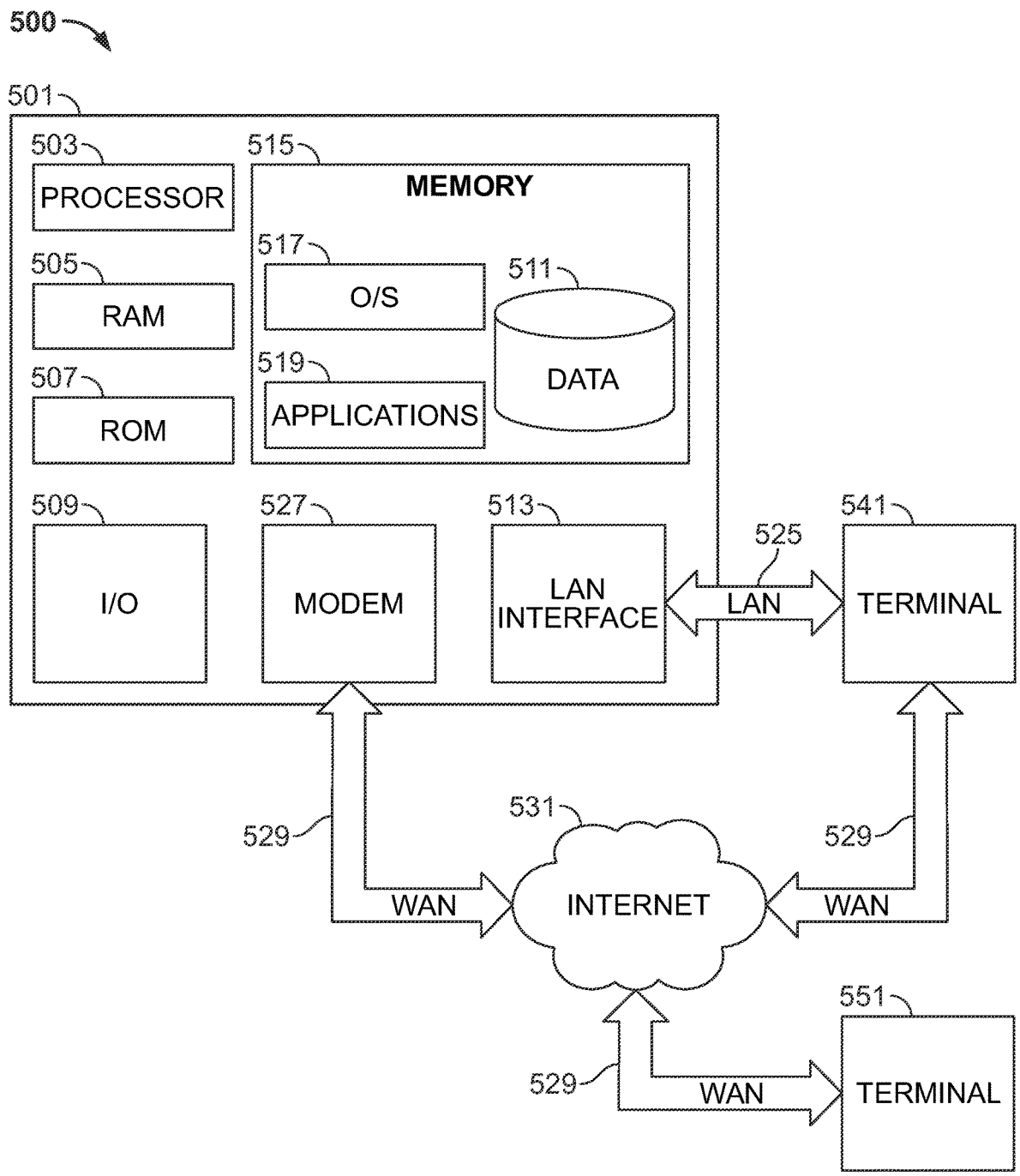
FIG. 5 shows an illustrative system in accordance with the principles of the disclosure.

FIG. 5 shows an illustrative block diagram of system 500 that includes computer 501. Computer 501 may alternatively be referred to herein as a "server" or a "computing device." Computer 501 may be a workstation, desktop, laptop, tablet, smart phone, ATM, satellite, or any other suitable computing device. Elements of system 500, including computer 501, may be used to implement various aspects of the systems and methods disclosed herein.

Computer 501 may have a processor 503 for controlling the operation of the device and its associated components, and may include RAM 505, ROM 507, input/output module 509, and a memory 515. The processor 503 may also execute all software running on the computer—e.g., the operating system and/or voice recognition software. Other components commonly used for computers, such as EEPROM or Flash memory or any other suitable components, may also be part of the computer 501.

Memory 515 may be comprised of any suitable permanent storage technology—e.g., a hard drive. The memory 515 may store software including the operating system 517 and application(s) 519 along with any data 511 needed for the operation of the system 500. Memory 515 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). Computer 501 may execute the instructions embodied by the software to perform various functions.

Input/output ("I/O") module may include connectivity to a microphone, keyboard, touch screen, mouse, and/or stylus through which a user of computer 501 may provide input. The input may include input relating to cursor movement. The input may relate to database backup, search, and recovery. The input/output module may also include one or more speakers for providing audio output and a video display device for providing textual, audio, audiovisual, and/or graphical output. The input and output may be related to computer application functionality. The input and output may be related to database backup, search, and recovery.

System 500 may be connected to other systems via a local area network ("LAN") interface 513. System 500 may operate in a networked environment supporting connections to one or more remote computers, such as terminals 541 and 551. Terminals 541 and 551 may be personal computers or servers that include many or all the elements described above relative to system 500.

The network connections depicted in FIG. 5 include a LAN 525 and a wide area network ("WAN") 529 but may also include other networks. When used in a LAN networking environment, computer 501 is connected to LAN 525 through a LAN interface or adapter 513. When used in a WAN networking environment, computer 501 may include a modem 527 or other means for establishing communications over WAN 529, such as Internet 531.

It will be appreciated if the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 519, which may be used by computer 501, may include computer executable instructions for invoking user functionality related to communication, such as e-mail, Short Message Service ("SMS"), and voice input and speech recognition applications. Application program(s) 519 (which may be alternatively referred to herein as "plugins," "applications," or "apps") may include computer executable instructions for invoking user functionality related performing various tasks. The various tasks may be related to database backup, search, and recovery.

Computer 501 and/or terminals 541 and 551 may also be devices including various other components, such as a battery, speaker, and/or antennas (not shown).

Terminal 551 and/or terminal 541 may be portable devices such as a laptop, cell phone, Blackberry™, tablet, smartphone, or any other suitable device for receiving, storing, transmitting and/or displaying relevant information. Terminals 551 and/or terminal 541 may be other devices. These devices may be identical to system 500 or different. The differences may be related to hardware components and/or software components.

Any information described above in connection with database 511, and any other suitable information, may be stored in memory 515. One or more of applications 519 may include one or more algorithms that may be used to implement features of the disclosure, and/or any other suitable tasks.

The disclosure may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc., that perform tasks or implement abstract data types. The disclosure may also be practiced in distributed computing environments where tasks are performed by remote processing devices that are linked through a communications network. In a distributed computing environment, program modules may be in both local and remote computer storage media including memory storage devices.

Figure 6:
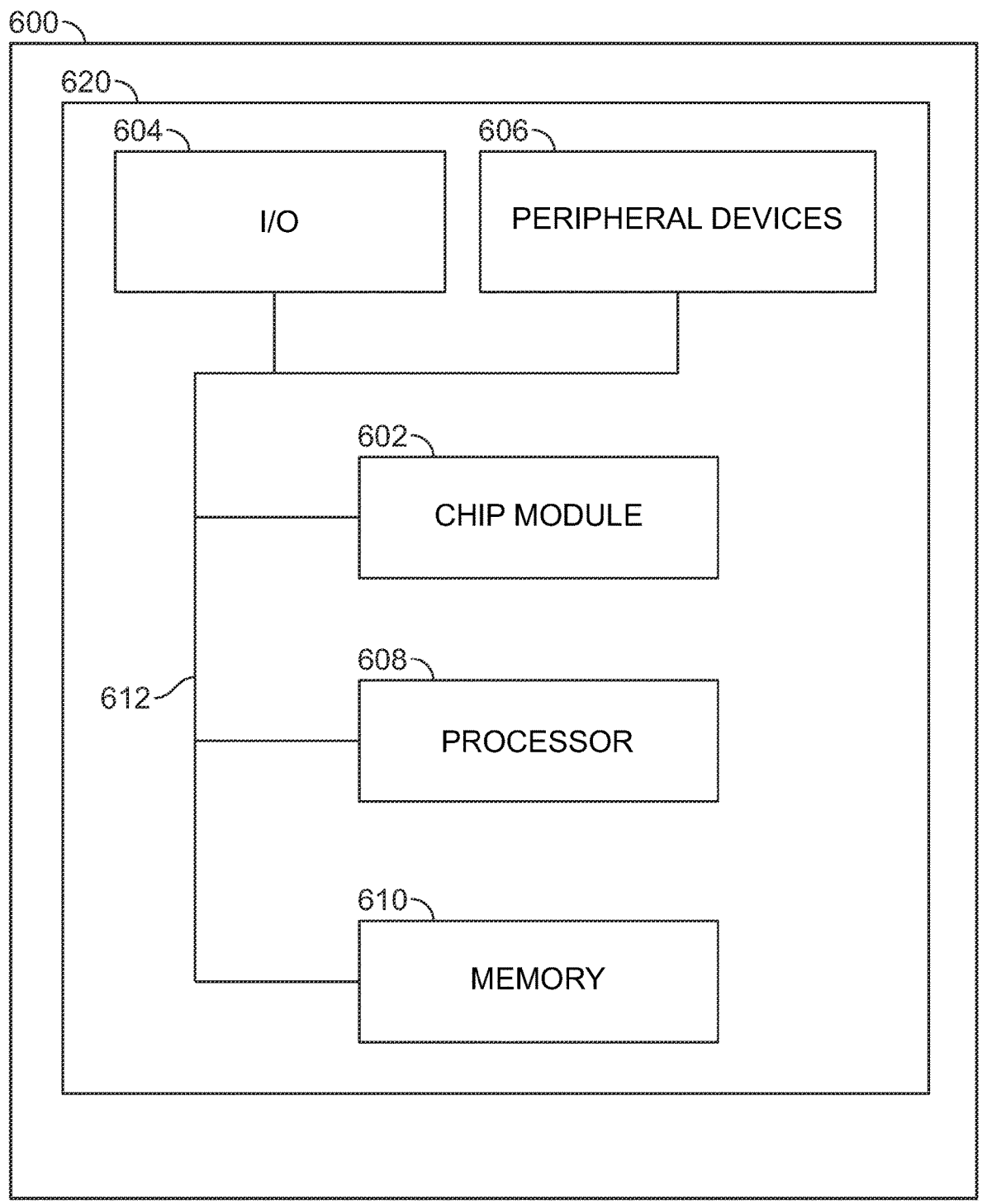
FIG. 6 shows illustrative information in accordance with the principles of the disclosure along with some of the system shown in FIG. 5.

FIG. 6 shows illustrative system 600 that may be configured in accordance with the principles of the disclosure. System 600 may be a computing machine. System 600 may include one or more features of the system shown in FIG. 5. System 600 may include chip module 602, which may include one or more integrated circuits, and which may include logic configured to perform any other suitable logical operations.

System 600 may include one or more of the following components: I/O circuitry 604, which may include a transmitter device and a computer device and may interface with fiber optic cable, coaxial cable, telephone lines, wireless devices, PHY layer hardware, a camera/display control device or any other suitable media or devices; peripheral devices 606, which may include counter timers, real-time timers, power-on reset generators or any other suitable peripheral devices; logical processing device 608, which may compute data structural information and structural parameters of the data; and machine-readable memory 610.

Machine-readable memory 610 may be configured to store in machine-readable data structures: machine executable instructions (which may be alternatively referred to herein as "computer instructions" or "computer code"), applications, signals, and/or any other suitable information or data structures.

Components 602, 604, 606, 608 and 610 may be coupled together by a system bus or other interconnections 612 and may be present on one or more circuit boards such as 620. In some embodiments, the components may be integrated into a single chip. The chip may be silicon-based.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for autonomously controlling and monitoring ATMs, leveraging a network of low-orbit satellites, during an ATM distress event, are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for autonomously controlling and monitoring automatic teller machines ("ATMs") during an ATM distress event, the autonomously controlling and monitoring being executed by a network of low-orbit satellites, the method comprising:

identifying, at a first ATM, the ATM distress event;
creating, using an ATM distress program stored on the first ATM, a distress message payload ("DMP") associated with the first ATM, the DMP comprising:
   a geolocation of the first ATM;
   an ownership of the first ATM; and
   the ATM distress event;
transmitting, using the first ATM, the DMP to a first low-orbit satellite in the network of low-orbit satellites;
transmitting, using the first low-orbit satellite, the DMP to all low-orbit satellites in the network of low-orbit satellites;
scanning, using an ATM monitoring program stored on all low-orbit satellites in the network of low-orbit satellites, all ATMs affected by the ATM distress event, including the first ATM ("the ATMs");
transmitting, using low-orbit satellites in the network of low-orbit satellites located threshold distances from the ATMs, a data recovery and purge program to the ATMs;
creating, using the data recovery and purge program in the ATMs, data recovery and purge payloads ("DRAPPs"), the DRAPPs associated with the ATMs, the DRAPPs comprising:
   geolocations of the ATMs;
   ownerships of the ATMs; and
   data stored on the ATMs;
storing, on all low-orbit satellites in the network of low-orbit satellites, the DRAPPs;
purging, using the data recovery and purge program stored on the ATMs, the data stored on the ATMs;
running a recovery/purge orchestration engine, using the first low-orbit satellite, the recovery/purge orchestration engine using machine learning ("ML") to identify a pathway for transporting the DRAPPs to a centralized server, the pathway comprising all low-orbit satellites in the network of low-orbit satellites operating as carriers for the DRAPPs to the centralized server;
storing, on all low-orbit satellites in the network of low-orbit satellites, a copy of the DRAPPs in a satellite blockchain distributed ledger, wherein each low-orbit satellite in the network of low-orbit satellites is a block in the satellite blockchain distributed ledger;
receiving on the centralized server, via the recovery/purge orchestration engine, the DRAPPs; and
transferring, after the ATM distress event, the DRAPPs between low-orbit satellites in the network of low-orbit satellites located threshold distances from the ATMs and the ATMs, via the centralized server.

2. The method of claim 1 further comprising, following a lapse of a pre-determined amount of time:
   deleting, via the first low-orbit satellite, the DRAPPs from the satellite blockchain distributed ledger; and
   deleting, via the recovery/purge orchestration engine, the DRAPPs from the centralized server.

3. The method of claim 1 further comprising, following the transferring of the DRAPPs to the ATMs, deleting the DRAPPs from the satellite blockchain distributed ledger, via the first low-orbit satellite.

4. The method of claim 3 further comprising, following the transferring of the DRAPPs to the ATMs, deleting the DRAPPs from the centralized server, via the recovery/purge orchestration engine.

5. The method of claim 1 wherein each copy of the DRAPPs in the satellite blockchain distributed ledger is broadcast as blocks to an earth-based blockchain distributed ledger.

6. The method of claim 1 further comprising, following the transferring the DRAPPs to the ATMs, transferring, via the centralized server, the DRAPPs to smartphones.

7. The method of claim 1 wherein the network of low-orbit satellites is pre-registered with an entity network associated with the centralized server.

8. The method of claim 1 further comprising, reserving, via the recovery/purge orchestration engine at the first low-orbit satellite, the low-orbit satellites identified by ML for the pathway for transporting the DRAPPs.

9. The method of claim 1 further comprising, optimizing the pathway, via the recovery/purge orchestration engine at the first low-orbit satellite, based on a DMP type associated with the ATM distress event.

10. The method of claim 9 wherein the DMP type is one of a low-value distress, a high-value distress, a time-sensitive distress, a physical distress, an electrical distress, a human-related distress, and a weather-related distress.

11. The method of claim 10 further comprising, when the DMP type is time-sensitive, the method comprises selecting, via the recovery/purge orchestration engine, low-orbit satellites from within the network of low-orbit satellites that enables a quickest transmission of the DRAPPs to the centralized server.

12. The method of claim 1 further comprising:
   identifying, at the ATMs, additional potential ATM distress events;
   scanning, using an ATM distress analyzer engine in all low-orbit satellites in the network of low-orbit satellites, based on the DMP, all ATMs affected by the additional potential ATM distress events, including the ATMs ("the ATMs");
   transmitting, using low-orbit satellites in the network of low-orbit satellites located threshold distances from the ATMs, a preventive data recovery and purge program to the ATMs;
   creating, using the preventive data recovery and purge program in the ATMs, DRAPPs, the DRAPPs associated with the ATMs, the DRAPPs comprising:
      geolocations of the ATMs;
      ownerships of the ATMs; and
      data stored on the ATMs;
   storing, using all low-orbit satellites in the network of low-orbit satellites, the DRAPPs;
   purging, using the preventive data recovery and purge program in the ATMs, the data stored on the ATMs;
   running the recovery/purge orchestration engine, using the first low-orbit satellite, the recovery/purge orchestration engine using ML to identify a pathway for transporting the DRAPPs, the pathway comprising all low-orbit satellites from the network of low-orbit satellites operating as carriers for the DRAPPs to a centralized server;
   storing, using all low-orbit satellites in the network of low-orbit satellites, a copy of the DRAPPs in a satellite blockchain distributed ledger, wherein each low-orbit satellite in the network of low-orbit satellites is a block in the satellite blockchain distributed ledger;
   receiving on the centralized server, via the recovery/purge orchestration engine, the DRAPPs; and
   transferring, after the additional potential ATM distress events, the DRAPPs between low-orbit satellites in the network of low-orbit satellites located threshold distances from the ATMs, via the centralized server.

13. The method of claim 12 further comprising, after creating the DRAPPs, subjecting the DRAPPs to homomorphic encryption.

14. A system for autonomously controlling and monitoring automatic teller machines ("ATMs") during an ATM distress event, the system comprising:
ATMs and a network of low-orbit satellites, each low-orbit satellite within the network of low-orbit satellites operating as an authentic node, each authentic node maintaining a satellite blockchain distributed ledger, the low-orbit satellites in the network of low-orbit satellites configured to:
identify, at a first ATM, associated with the ATMs, the ATM distress event;
create, using an ATM distress program in the first ATM, a distress message payload ("DMP") associated with the first ATM, the DMP comprising:
a geolocation of the first ATM;
an ownership of the first ATM; and
the ATM distress event;
transmit, using the first ATM, the DMP to a first low-orbit satellite;
transmit, using the first low-orbit satellite, the DMP to all low-orbit satellites in the network of low-orbit satellites;
scan, using an ATM monitoring program in the network of low-orbit satellites, ATMs affected by the ATM distress event, including the first ATM ("the ATMs");
transmit, using low-orbit satellites in the network of low-orbit satellites located threshold distances from the ATMs, a data recovery and purge program to the ATMs;
create, using the data recovery and purge program in the ATMs, data recovery and purge payloads ("DRAPPs"), the DRAPPs associated with the ATMs, the DRAPPs comprising:
geolocations of the ATMs;
ownerships of the ATMs; and
data stored on the ATMs;
store, using all low-orbit satellites in the network of low-orbit satellites, the DRAPPs;
purge, using the data recovery and purge program in the ATMs, the data stored on the ATMs;
run a recovery/purge orchestration engine, using the first low-orbit satellite, the recovery/purge orchestration engine using machine learning ("ML") to identify a pathway for transporting the DRAPPs, the pathway comprising low-orbit satellites from the network of low-orbit satellites operating as carriers for the DRAPPs to a centralized server;
store, using all low-orbit satellites in the network of low-orbit satellites, a copy of the DRAPPs in the satellite blockchain distributed ledger, wherein each low-orbit satellite in the network of low-orbit satellites is a block in the satellite blockchain distributed ledger;
receive on the centralized server, via the recovery/purge orchestration engine, the DRAPPs; and
transfer, after the ATM distress event, the DRAPPs between low-orbit satellites in the network of low-orbit satellites located threshold distances from the ATMs and the ATMs, via the centralized server.

15. The system of claim 14 wherein each authentic node is authenticated by an entity network associated with the centralized server prior to being added to the network of low-orbit satellites.

16. The system of claim 14 wherein the recovery/purge orchestration engine comprises rules defined between an entity network, the ATMs, and all the satellites in the network of low-orbit satellites.

17. The system of claim 14 wherein the satellite blockchain distributed ledger is synchronized with an earth-based blockchain distributed ledger.

18. The system of claim 17 wherein following the receiving of the DRAPPs at the centralized server, the system is further configured to delete the DRAPPs from all the satellites in the network of low-orbit satellites.

19. A system for autonomously controlling and monitoring automatic teller machines ("ATMs") during an ATM distress event, the system comprising:
ATMs and a network of low-orbit satellites, each low-orbit satellite within the network operating as an authentic node, each authentic node maintaining a satellite blockchain distributed ledger, the system configured to:
identify, at a first ATM, the ATM distress event;
create, using an ATM distress program in a first ATM, a distress message payload ("DMP") associated with the first ATM, the DMP comprising:
a geolocation of the first ATM;
an ownership of the first ATM; and
the ATM distress event;
transmit, using the first ATM, the DMP to a first low-orbit satellite;
transmit, using the first low-orbit satellite, the DMP to all low-orbit satellites in the network of low-orbit satellites;
scan, using an ATM monitoring program in all low-orbit satellites in the network of low-orbit satellites, ATMs affected by the ATM distress event, including the first ATM ("the ATMs");
transmit, using low-orbit satellites in the network of low-orbit satellites located threshold distances from the ATMs, a data recovery and purge program to the ATMs;
create, using the data recovery and purge program in the ATMs, data recovery and purge payloads ("DRAPPs"), the DRAPPs associated with the ATMs, the DRAPPs comprising:
geolocations of the ATMs;
ownerships of the ATMs; and
data stored on the ATMs;
store, using all low-orbit satellites in the network of low-orbit satellites, the DRAPPs;
purge, using the data recovery and purge program in the ATMs, the data stored on the ATMs;
run a recovery/purge orchestration engine, using the first low-orbit satellite, the recovery/purge orchestration engine using machine learning ("ML") to identify a pathway for transporting the DRAPPs, the pathway comprising low-orbit satellites from the network of low-orbit satellites operating as carriers for the DRAPPs to a centralized server;
store, using all low-orbit satellites in the network of low-orbit satellites, a copy of the DRAPPs in the satellite blockchain distributed ledger, wherein each low-orbit satellite in the network of low-orbit satellites is a block in the satellite blockchain distributed ledger;
receive on the centralized server, via the recovery/purge orchestration engine, the DRAPPs;
transfer, after the ATM distress event, the DRAPPs between low-orbit satellites in the network of low-orbit satellites located threshold distances from the ATMs and the ATMs, via the centralized server; and
following a lapse of a pre-determined amount of time:
delete, via the first low-orbit satellite, the DRAPPs from the satellite blockchain distributed ledger; and delete, via the recovery/purge orchestration engine, the DRAPPs from the centralized server.

20. The system of claim 19 wherein the system further comprises smartphones, and the system is configured to transfer, via the centralized server, the DRAPPs to the smartphones.

\* \* \* \* \*